United States Patent Office 3,008,802
Patented Nov. 14, 1961

3,008,802
RECRYSTALLIZING A RECONSTITUTED
FLUORINE-MICA SHEET
Robert A. Hatch, St. Paul, Minn., and Haskiel R. Shell, Norris, Tenn., assignors to the United States of America as represented by the Secretary of the Interior
No Drawing. Filed Mar. 18, 1957, Ser. No. 646,936
18 Claims. (Cl. 23—110)
(Granted under Title 35, U.S. Code (1952), sec. 266)

This invention herein described and claimed, may be manufactured and used by or for the Government of the United States of America, for governmental purposes without the payment of any royalties thereon or therefor.

This invention relates to synthetic mica, and more particularly to a method for bonding synthetic mica flakes to form a laminated synthetic mica product.

Sheet materials made from natural water-containing micas are available today. Most of them are bonded with organic binders, such as shellac, varnish, or silicones, or with inorganic binders, such as sodium silicate, or phosphoric acid.

In no case can a composition made from natural water-containing mica be used at temperatures much above 800° C. Water is eliminated from the mica molecule at a temperature of from 500° C. to 800° C. and the mica disintegrates. When organic binders are used 200° C. to 300° C. is the upper temperature limit of the material. Because of these limitations, bonded sheet mica up to now has not been found suitable for use as vacuum tube spacers, one of the major use of sheet mica in the electronics industry.

Accordingly, it is an object of this invention to provide a method for bonding flakes of synthetic mica to form a laminated sheet stable above 800° C.

It is a further object of this invention to provide a method for fabricating synthetic mica flakes of one composition into a sheet wherein the final product is free of any bonding agent.

It is a further object of this invention to crystallize, by the simultaneous application of heat and pressure, a sheet consisting of fine flakes of fluor-phlogopite mica, or one of its high temperature isomorphs described in U.S. Patent 2,675,853, while employing a small amount of an inorganic salt which is completely volatile at the temperature employed, and which we denote as a fugitive mineralizer.

A further object is to provide a sheet of synthetic mica of one composition, formed from mica flakes.

Other objects and advantages will appear from the following description.

Mica refers to a family of chemically and structurally related inorganic crystalline compounds having the general formula:

$$(X_{1/2 \text{ to } 1})(Y_{2 \text{ to } 3})Z_4O_{10}(OH,F)_2$$

where X refers to large univalent or divalent cations having ionic radii greater than about 1 A.U., each cation in the structure being surrounded by 12 oxygen anions as nearest neighbors (so-called 12-fold coordination or $X-O_{12}$). The X position usually is occupied by potassium ($K^+$) in most natural micas but in synthetics it may be replaced by sodium ($Na^+$), rubidium ($Rb^+$), thallium ($Tl^+$), cesium ($Cs^+$), calcium ($Ca^{++}$), strontium ($Sr^{++}$), barium ($Ba^{++}$), and lead ($Pb^{++}$).

Y refers to intermediate-sized cations (0.6 to 0.9 A.U.) in 6-fold coordination ($Y-O_6$). The most abundant and commercially important mica in nature is the variety muscovite:

in which aluminum ($Al^{+++}$) cations occupy the Y position. Another important variety is phlogopite

in which magnesium ($Mg^{++}$) cations occupy the Y position. The mica structure is much more stable with divalent cations occupying the 3 available Y positions, consequently a number of such cations can replace magnesium completely in the synthetic fluor-phlogopite structure, such as iron ($Fe^{++}$), cobalt ($Co^{++}$), and nickel ($Ni^{++}$), or partially replace magnesium, such as manganese ($Mn^{++}$), lithium ($Li^+$), titanium ($Ti^{++}$), zinc ($Zn^{++}$), and copper ($Cu^{++}$).

Z refers to small and/or highly charged cations in 4-fold coordination with oxygen ($Z-O_4$). In most types of mica the 4 Z positions are occupied by 3 silicon ($Si^{++++}$) cations and 1 aluminum ($Al^{+++}$), trisilicic micas. However, tetrasilicic (4 silicon) types and disilicic (2 silicon plus 2 aluminum) types are known. In some types of fluor-phlogopite the silicon can be replaced completely with germanium ($Ge^{++++}$), in most types the aluminum cation can be replaced with an equivalent amount of beryllium ($Be^{++}$), boron ($B^{+++}$), iron ($Fe^{+++}$), manganese ($Mn^{+++}$), vanadium ($V^{+++}$), chromium ($Cr^{+++}$), and gallium ($Ga^{+++}$).

$O^=$ refers to the oxygen anion, $OH^-$ to the hydroxyl anion commonly present in most natural micas, and $F^-$ refers to fluorine which completely replaces OH in the synthetic mica products described in this invention.

As in all silicate structures, the basic unit (building block) of the mica structure is the $(Si,Al)O_4$ or $Z-O_4$ tetrahedron. These are linked together along the base to form a hexagonal network sheet, the oxygen anion at the apices of the pyramids all pointing in the same direction. The hydroxyl or fluorine anions fit into the hexagonal holes outlined by the apex oxygens. The simplest structure preserving the composition of mica contains two such sheets bonded together with the Y position cations in 6-fold coordination. Successive double layers are bonded together with the large X position cation which fit snugly into hexagonal holes outlined by the bases of the $(Si,Al)O_4$ linked tetrahedra.

A large number of synthetic mica compositions of varying properties and melting temperatures and suitable for the purposes of this invention may be prepared by isomorphic replacement of ions in the mica structure. Mica compositions that can be prepared in this manner are the synthetic fluorine micas. The so-called "normal" fluorine phlogopite mica of a composition corresponding to the formula $KMg_3AlSi_3O_{10}F_2$, is a mica of this type. This material may be prepared by melting materials such as $K_2SiF_6$, $K_2CO_3$, $MgO$, $Al_2O_3$ and $SiO_2$ or others providing the necessary components, in the proportions indicated by the formula under conditions minimizing volatilization of the fluorides, and then crystallizing the mica from the melt by slow cooling. Fluoride-micas of this type crystallize readily from a melt of similar composition.

Synthetic micas of different melting points may be produced by substituting other ions into the phlogopite structure on the basis of well known crystal-chemical laws. For example, the potassium ion of $KMg_3AlSi_3O_{10}F_2$ can be completely replaced with sodium, rubidium, thallium, cesium, calcium, strontium, barium, and lead. The magnesium can be replaced completely with ferrous iron, cobalt, and nickel; by about two-thirds with divalent manganese; by about one-third with lithium and divalent titanium; and about one-sixth with zinc and copper. The aluminum can be replaced with beryllium, boron, ferric ion, trivalent manganese, vanadium, silicon, and in part with chromium. The silicon can be completely replaced with germanium. Other ions may be silver, cadmium, lanthanum, neodymium, tetravalent titanium, scandium, gallium, columbium, and chlorine. The greatest majority of these compositions exhibit lower melting temperatures than the fluorine-mica of the formula $$KMg_3AlSi_3O_{10}F_2$$

Examples of several of the many substituted synthetic, fluorine-micas are those of composition corresponding to the formulas:

$$KMg_3BSi_3O_{10}F_2$$

and $$KMg_2LiSi_4O_{10}F_2$$

It is readily apparent that the fluorine-mica family is inclusive of an extensive series of compounds obtainable by substitution of other ions in the phlogopite structure.

Synthetic fluor-phlogopite mica having the composition $KMg_3AlSi_3O_{10}F_2$ melts at a temperature of 1350° C. without serious decomposition or volatilization. By contrast the corresponding natural phlogopite mica of the composition $KMg_3AlSi_3O_{10}(OH)_2$ decomposes at a much lower temperature because of the separation of $H_2O$ from the molecule.

U.S. Patent 2,675,853 teaches that a compact impervious sheet of synthetic fluorine mica may be made by hot-pressing a mixture of two synthetic fluorine-micas (each having a different melting temperature, for example 1350° C. and 1150° C. respectively) at some intermediate temperature (for example 1200° C. to 1250° C.). While the product obtained is suitable for many uses, it does not have the necessary strength and resistance to withstand the rough handling encountered in die stamping operations used in making vacuum tube spacers.

We have now discovered that a superior product of uniform composition may be obtained by crystallizing, employing heat and pressure, a sheet consisting of fine flakes of a synthetic fluorine-containing mica admixed with a small quantity of fugitive salt, e.g., $NH_4F$, $NH_4HF_2$, $NH_4Cl$, etc.

The use of a fugitive mineralizer results in a sheet of synthetic mica which is stronger mechanically and more flexible than produced heretofore by methods employing inorganic bonding or cementing. Because of the high temperatures involved, the process described herein is not applicable to natural micas which contain "water of constitution." This method of creating a bond between the flakes of mica preserves the markedly superior heat resistance of synthetic fluorine-micas which would otherwise be lost if the usual organic binders or glass were used. Furthermore, the good to excellent dielectric properties (especially the power factor), of the synthetic mica, which are adversely affected by the use of sodium silicate or glass as a cement or binder, are preserved. The fugitive mineralizer is completely volatilized, leaving nothing but pure recrystallized mica approaching a single crystal in its properties. Thus, the superior chemical and weathering resistance of synthetic fluorine-mica which are adversely affected by the use of organic binders and inorganic cements such as glass, sodium silicate, and phosphates, are preserved. Also, this method of recrystallizing the fluorine-mica sheet preserves the excellent machining and stamping qualities of the mica which might otherwise be impaired if a hard material such as glass or sodium silicate were used as a cement. As this method of creating a bond between the mica flakes eliminates the use of a lower melting fluorine-mica, the temperature stability and use of this new material when composed 100 percent of fluor-phlogopite mica of the composition $KMg_3AlSi_3O_{10}F_2$ is at least 200° C. higher than the material described in Patent 2,675,853, which in turn is 200° to 700° C. better than any laminated natural mica product developed to date.

Although a fugitive mineralizer could be used with the mica mixture described in U.S. Patent 2,675,853, a stronger and more flexible product is obtained when only one kind of a fluorine-mica composition is used. We have found the mica composition which gives the best results to be the so-called normal fluor-phlogopite, having the formula $KMg_3AlSi_3O_{10}F_2$. Nevertheless, the method of bonding is not restricted to just this one type of mica, but is applicable broadly to all types of fluorine mica and mixtures thereof.

While not wishing to be bound by any theory, it is believed that a homogeneous chemical bond between essentially parallel plates or flakes of fluorine-mica is developed on the application of heat and pressure. By "homogeneous chemical bonding," we mean that the individual mica flakes become attached to each other by their own structural bonds, in contrast (1) to the cementing together of mica flakes by heterogeneous bonds derived from extraneous crystalline compounds, either organic or inorganic, or glasses, and (2) to the solid solution type of bonding present in the joining together of two or more fluorine-micas having different chemical compositions, as in U.S. Patent 2,675,853.

The homogeneous chemical bond is believed to be developed by the promotion of recrystallization and grain growth through the use of a volatile or fugitive mineralizer, such as ammonium fluoride ($NH_4F$), ammonium hydrogen fluoride ($NH_4HF_2$), ammonium fluoborate ($NH_4BF_4$), or other fluorine or non-fluorine containing compounds such as, for example, ammonium chloride ($NH_4Cl$), or ammonium nitrate ($NH_4NO_3$) etc. In general any salt completely volatilizing at the temperatures employed may be used.

The fugitive mineralizer apparently lowers the melting temperature of the surface of the mica flakes, so that under the influence of the simultaneously applied heat and pressure, extensive recrystallization and structural bonding takes place. The considerable amount of grain growth that occurs in the presence of the mineralizer is good evidence of the great mobility of the ions in the surface layers of the mica flakes. The net result of the application of this invention is the production of a fluorine-mica sheet which approaches a single crystal in its properties. As a result of recrystallization, the sheet becomes impervious and semi-transparent, and at the same time develops good mechanical strength, flexibility and elasticity.

Partially volatile mineralizers such as KOH, $KNO_3$, $MgCl_2$, etc., or non-volatile mineralizers such as KF, $K_2SiF_6$, etc., result in mica sheets which are weak and brittle even though very often considerable recrystallization has taken place. The residue from these classes of mineralizers apparently prevents the development of strong bonds between the mica flakes. On the other hand, no interfering residues or reaction products have been detected in the case of volatile mineralizers.

The following steps are involved in one method for the preparation of a unitary laminated, fluorine-mica sheet according to our invention.

(a) Coarse flakes or "books" of fluorine-mica are disintegrated, mechanically or otherwise, so as to retain the chemical identity of mica. The disintegrated mica is then formed into a sheet by a modified paper making process such as that described in U.S. Patents 2,405,576 and 2,490,129. On a laboratory scale, the mica is shredded in a Waring Blendor half filled with distilled water, and the suspension is then poured onto a suction filter to form a sheet of reconstituted mica.

(b) The mica sheet is pressed to compact it and to more perfectly orient the crystal flakes parallel to one another. The sheet is dried at about 110° C. to remove the water.

(c) The sheet is then saturated with an aqueous solution of the fugitive mineralizer, and then dried so as to have the mineralizer dispersed throughout the pores of the mica sheet.

(d) The mica sheet is then hot-pressed between thin sheets of metal foil, e.g., molybdenum, steel, etc., at a temperature sufficiently high to recrystallize the mica, usually about 1100° C. to 1300° C. for the normal fluor-phlogopite composition, while applying a pressure of 300 p.s.i. or higher. The pressing operation may be a static process using, for example, an induction heated graphite die, or it may be a kinetic process involving the passage of the heated mica-metal foil sandwich through a series of pressure rollers. In either case the metal foil helps to retain the volatile mineralizer in the mica until recrystallization and bonding are accomplished.

The temperature to which the mica is heated should be in the range of 1100° to 1300° C. preferably 1200° to 1250° C. The pressure simultaneously applied to the sheet should be as high as possible, that is, 300 p.s.i. or higher. The time of application of hot-pressing under optimum conditions may range from 5 to 30 minutes, 15 minutes, being a representative average time in which to develop the recrystallized bond between mica flakes.

The optimum concentration of the solution and the amount of solution added to the mica have to be determined by experiment. Such factors as tightness of seal of the metal foil sandwich and of the die have a profound effect on the rate of volatilization loss of the fugitive mineralizer from the paper or sheet. Obviously a small amount of mineralizer which is permitted to escape very slowly may be much more effective as a recrystallizing agent than a larger amount that escapes rapidly. Especially is this true if at least some of the mineralizer is not retained in the mica sheet until the maximum operating temperature is reached. Also influencing the amount of mineralizer needed are (1) the thickness of the mica sheet (amount of mica per unit area), (2) the amount of fine mica particles present in the sheet (surface area of particles), (3) the amount of pressure applied during the hot-pressing operation, (4) the temperature to which the sheet is heated, and (5) the length of time of application of optimum temperature-pressure conditions.

Means other than metal foil may be employed for retaining the volatile mineralizer, as for example shallow recessed dies.

The invention is further illustrated, but not limited by the following specific examples:

Example I

To a 4-gram 3½ inch diameter circular sheet of reconstituted fluorphlogopite mica ($KMg_3AlSi_3O_{10}F_2$) which has been dried, 3 cc. of a 24% solution of $NH_4HF_2$ in distilled water was added. The sheet was then dried and hot-pressed between metal sheets at a temperature of 1250–1300° C., a pressure above 300 p.s.i. for about 15 minutes. The final thickness of the mica sheet was about .01 inch. As a result of the treatment a recrystallized bond exists between the flakes. The sheet was semi-transparent, and had good mechanical strength, flexibility and elasticity.

Example II

To a reconstituted 4–5 gram sheet of fluor-phlogopite mica ($KMg_3AlSi_3O_{10}F_2$) as in Example I, approximately 4 cc. of a 24% aqueous solution of $NH_4F$ was added. The sheet was then dried and hot-pressed between metal sheets at a temperature of 1250° C. to 1300° C., a pressure of 600 p.s.i. for 20 minutes. After removal from the press the sheet was examined. It exhibited the same physical properties as that of Example I.

Example III

Six cc. of a 25% $NH_4BF_4$ aqueous solution were added to a 4–5 gram sheet of fluor-phlogopite mica $$(KMg_3AlSi_3O_{10}F_2)$$

similar to that in Example I. The sheet was then dried and hot-pressed between metal sheets at a temperature of 1250–1300° C. at a pressure of 600 p.s.i. and a time of 20–25 minutes. The resulting sheet was similar to that produced by treatment with $NH_4HF_2$ in all essential respects.

It is obvious that the invention described herein is susceptible of various modifications and changes, without departing from the spirit thereof. It is therefore to be broadly construed, and to be limited only by the scope of the appended claims.

We claim:

1. The method of forming an article of mica comprising intermixing at least one mica selected from the group having the composition:

$$(X_{1/2 \text{ to } 1})(Y_{2 \text{ to } 3})Z_4O_{10}F_2$$

wherein X is a cation selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is a cation selected from the group consisting of $Mg^{++}$, $Fe^{++}$, $Co^{++}$, $Ni^{++}$, and a combination of $Mg^{++}$ with a cation selected from the group consisting of $Mn^{++}$, $Li^+$, $Ti^{++}$, $Zn^{++}$, and $Cu^{++}$, Z is a cation selected from the group consisting of $Si^{++++}$, $Ge^{++++}$, and a combination of $Si^{++++}$ with a cation selected from the group consisting of $Al^{+++}$, $Be^{++}$, $B^{+++}$, $Fe^{+++}$, $Mn^{+++}$, $V^{+++}$, and $Cr^{+++}$, O is oxygen, and F is fluorine, with a fugitive mineralizer, and hot-pressing the resulting mixture at a temperature and pressure at which recrystallization of the mica takes place, said fugitive mineralizer comprising an inorganic ammonium salt completely volatile at the hot press temperature.

2. The method of forming an article of mica which comprises forming a mixture of particles of at least one form of mica selected from the group having the composition:

$$(X_{1/2 \text{ to } 1})(Y_{2 \text{ to } 3})Z_4O_{10}F_2$$

wherein X is a cation selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is a cation selected from the group consisting of $Mg^{++}$, $Fe^{++}$, $Co^{++}$, $Ni^{++}$, and a combination of $Mg^{++}$ with a cation selected from the group consisting of $Mn^{++}$, $Li^+$, $Ti^{++}$, $Zn^{++}$, and $Cu^{++}$, Z is a cation selected from the group consisting of $Si^{++++}$, $Ge^{++++}$, and a combination of $Si^{++++}$ with a cation selected from the group consisting of $Al^{+++}$, $Be^{++}$, $B^{+++}$, $Fe^{+++}$, $Mn^{+++}$, $V^{+++}$, and $Cr^{+++}$, O is oxygen, and F is fluorine, with a fugitive mineralizer selected from the group consisting of $NH_4F$, $NH_4HF_2$, $NH_4BF_4$, $NH_4Cl$ and $NH_4NO_3$, and mixtures thereof, and subjecting said first mixture to a temperature and pressure at which recrystallization of the mica takes place.

3. The method of forming a laminated mica article from particles of at least one form of mica selected from the group having the composition $$(X_{1/2 \text{ to } 1})(Y_{2 \text{ to } 3})Z_4O_{10}F_2$$

wherein X is a cation selected from the group consisting of $K^+$, $Na^+$, $Rb^+$, $Tl^+$, $Cs^+$, $Ca^{++}$, $Sr^{++}$, $Ba^{++}$, and $Pb^{++}$, Y is a cation selected from the group consisting of $Mg^{++}$, $Fe^{++}$, $Co^{++}$, $Ni^{++}$, and a combination of $Mg^{++}$ with a cation selected from the group consisting of $Mn^{++}$, $Li^+$, $Ti^{++}$, $Zn^{++}$, and $Cu^{++}$, Z is a cation selected from the group consisting of $Si^{++++}$, $Ge^{++++}$, and a combination of $Si^{++++}$ with a cation selected from the group consisting of $Al^{+++}$, $Be^{++}$, $B^{+++}$, $Fe^{+++}$, $Mn^{+++}$, $V^{+++}$, and $Cr^{+++}$, O is oxygen, and F is fluorine, which comprises the steps of (1) forming a mica sheet from said mica particles; (2) impregnating said mica sheet with a solution of a fugitive mineralizer selected from the class consisting of NH₄F, NH₄HF₂, NH₄BF₄, NH₄Cl and NH₄NO₃ and mixtures thereof; (3) drying said mica sheet; and (4) subjecting said mica sheet to a temperature and pressure at which recrystallization of the mica takes place and the mineralizer vaporizes.

4. The method of forming a laminated mica article from particles of at least one form of mica selected from the group having the composition:

$$(X_{1/2 \text{ to } 1})(Y_{2 \text{ to } 3})Z_4O_{10}F_2$$

wherein X is a cation selected from the group consisting of K⁺, Na⁺, Rb⁺, Tl⁺, Cs⁺, Ca⁺⁺, Sr⁺⁺, Ba⁺⁺, and Pb⁺⁺, Y is a cation selected from the group consisting of Mg⁺⁺, Fe⁺⁺, Co⁺⁺, Ni⁺⁺, and a combination of Mg⁺⁺ with a cation selected from the group consisting of Mn⁺⁺, Li⁺, Ti⁺⁺, Zn⁺⁺, and Cu⁺⁺, Z is a cation selected from the group consisting of Si⁺⁺⁺⁺, Ge⁺⁺⁺⁺, and a combination of Si⁺⁺⁺⁺ with a cation selected from the group consisting of Al⁺⁺⁺, Be⁺⁺, B⁺⁺⁺, Fe⁺⁺⁺, Mn⁺⁺⁺, V⁺⁺⁺, and Cr⁺⁺⁺, O is oxygen, and F is fluorine, which comprises the steps of (1) forming a mica sheet from said mica particles; (2) impregnating said mica sheet with a solution of fugitive mineralizer selected from the class consisting of NH₄F, NH₄HF₂, NH₄BF₄, NH₄Cl and NH₄NO₃ and mixtures thereof; (3) drying said mica sheet; (4) placing said mica sheet between thin sheets of metal foil to form a sandwich; and (5) subjecting the sandwich to a temperature and pressure at which recrystallization of the mica takes place and the mineralizer vaporizes.

5. The method of forming a mica article which comprises forming a sheet from particles of a synthetic mica selected from the group having the composition:

$$(X_{1/2 \text{ to } 1})(Y_{2 \text{ to } 3})Z_4O_{10}F_2$$

where X is a cation selected from the group consisting of K⁺, Na⁺, Rb⁺, Tl⁺, Cs⁺, Ca⁺⁺, Sr⁺⁺, Ba⁺⁺, and Pb⁺⁺, Y is selected from the group consisting of Mg⁺⁺, Fe⁺⁺, Co⁺⁺, Ni⁺⁺, and a combination of Mg⁺⁺ with a cation selected from the group consisting of Mn⁺⁺, Li⁺, Ti⁺⁺, Zn⁺⁺, and Cu⁺⁺, Z is a cation selected from the group consisting of Si⁺⁺⁺⁺, Ge⁺⁺⁺⁺, and a combination of Si⁺⁺⁺⁺ with a cation selected from the group consisting of Al⁺⁺⁺, Be⁺⁺, B⁺⁺⁺, Fe⁺⁺⁺, Mn⁺⁺⁺, V⁺⁺⁺, and Cr⁺⁺⁺, O is oxygen, and F is fluorine, saturating said mica sheet with a solution of fugitive mineralizer selected from the class consisting of NH₄F, NH₄HF₂, NH₄BF₄, NH₄Cl and NH₄NO₃ and mixtures thereof, drying said mica sheet, and hot-pressing the dried sheet at a temperature and pressure at which recrystallization of the mica takes place and the mineralizer vaporizes.

6. The method of forming an article from (1) particles of fluorphlogopite mica having the formula $$KMg_3AlSi_3O_{10}F_2$$

and (2) particles of another mica selected from the group having the composition:

$$(X_{1/2 \text{ to } 1})(Y_{2 \text{ to } 3})Z_4O_{10}F_2$$

where X is a cation selected from the group consisting of K⁺, Na⁺, Rb⁺, Tl⁺, Cs⁺, Ca⁺⁺, Sr⁺⁺, Ba⁺⁺, and Pb⁺⁺, Y is a cation selected from the group consisting of Mg⁺⁺, Fe⁺⁺, Co⁺⁺, Ni⁺⁺, and a combination of Mg⁺⁺ with a cation selected from the group consisting of Mn⁺⁺, Li⁺, Ti⁺⁺, Zn⁺⁺, and Cu⁺⁺, Z is a cation selected from the group consisting of Si⁺⁺⁺⁺, Ge⁺⁺⁺⁺, and a combination of Si⁺⁺⁺⁺ with a cation selected from the group consisting of Al⁺⁺⁺, Be⁺⁺, B⁺⁺⁺, Fe⁺⁺⁺, Mn⁺⁺⁺, V⁺⁺⁺, and Cr⁺⁺⁺, O is oxygen, and F is fluorine, which comprises admixing the micas with a fugitive mineralizer selected from the group consisting of NH₄F, NH₄HF₂, NH₄BF₄, NH₄Cl and NH₄NO₃ and mixtures thereof, and subjecting said mixture of micas and mineralizer to a temperature and pressure at which recrystallization of the mica takes place.

7. The method of forming an article from particles of fluorphlogopite mica of the formula $$KMg_3AlSi_3O_{10}F_2$$

which comprises admixing the particles with fugitive mineralizer selected from the group consisting of NH₄F, NH₄HF₂, NH₄BF₄, NH₄Cl and NH₄NO₃ and mixtures thereof, and hot-pressing said mixture of mica and mineralizer to a temperature at which recrystallization takes place.

8. The method of forming a laminated mica article which comprises mixing thin flakes of a fluor-phlogopite mica of the composition KMg₃AlSi₃O₁₀F₂, with a solution of a fugitive mineralizer selected from the class consisting of NH₄F, NH₄HF₂, NH₄BF₄, NH₄Cl and NH₄NO₃ and mixtures thereof, drying said mixture, and subjecting said mixture to a temperature within the range of about 1100° C. to about 1300° C. and a pressure of at least 300 p.s.i.

9. The method of claim 8, wherein the fugitive mineralizer is NH₄HF₂.

10. The method of claim 8, wherein the fugitive mineralizer is NH₄F.

11. The method of claim 8, wherein the fugitive mineralizer is NH₄BF₄.

12. The method of forming a unitary sheet from particles of fluorphlogopite mica of the formula $$KMg_3AlSi_3O_{10}F_2$$

which comprises the steps of (1) forming a mica sheet from said particles; (2) saturating said mica sheet with a solution of a fugitive mineralizer selected from the class consisting of NH₄F, NH₄HF₂, NH₄BF₄, NH₄Cl and NH₄NO₃ and mixtures thereof; (3) drying said mica sheet; (4) placing said mica sheet between sheets of metal foil to form a sandwich; and (5) subjecting said sheet to a temperature within the range of about 1100° C. to about 1300° C. and a pressure of at least 300 p.s.i., so that recrystallization of the mica takes place.

13. A method as in claim 12, wherein the temperature is within the range of 1200° to 1250° C.

14. The method of forming a unitary mica sheet which comprises forming a sheet from particles of a fluorphlogopite mica of the formula KMg₃AlSi₃O₁₀F₂, which comprises impregnating said mica sheet with a solution of a fugitive mineralizer selected from the class consisting of NH₄F, NH₄HF₂, NH₄BF₄, NH₄Cl and NH₄NO₃ and mixtures thereof, drying said mica sheet, placing said dried mica sheet between sheets of metal foil to form a sandwich and subjecting the sandwich to a temperature and pressure at which recrystallization of the mica takes place and the mineralizer vaporizes.

15. A method as in claim 14 wherein the temperature is within the range of about 1100° C. to about 1300° C. and the pressure is at least 300 p.s.i.

16. A method as in claim 14 wherein the temperature is within the range of about 1200° C. to about 1250° C. and the pressure is at least 300 p.s.i.

17. A method for producing a recrystallized hot-pressed sheet of reconstituted synthetic fluorine mica which comprises the steps of contacting the surfaces of an unfired reconstituted synthetic fluorine mica sheet with an aqueous solution of a fugitive mineralizer, said fugitive mineralizer being an inorganic fluorine compound, and hot-pressing said contacted sheet to produce said recrystallized sheet.

18. A method for producing a recrystallized hot-pressed sheet of reconstituted synthetic fluorine mica which comprises the steps of contacting the surfaces of an unfired reconstituted synthetic fluorine mica sheet with an aqueous solution of an ammonium fluoride mineralizer, said ammonium fluoride mineralizer comprising a number of the class consisting of ammonium fluoride and ammonium acid fluoride, and hot-pressing said contacted sheet to produce said recrystallized sheet.

References Cited in the file of this patent

UNITED STATES PATENTS

| | | |
|---|---|---|
| 2,186,954 | Boughton et al. | Jan. 16, 1940 |
| 2,645,060 | Waggoner | July 14, 1953 |
| 2,788,837 | Barr | Apr. 16, 1957 |

OTHER REFERENCES

Kendall et al.: "Proceedings of International Congress of Pure and Applied Chemistry," pp. 167–170, 1947.